United States Patent [19]

Shtarkman et al.

[11] Patent Number: 5,354,488
[45] Date of Patent: Oct. 11, 1994

[54] FLUID RESPONSIVE TO A MAGNETIC FIELD

[75] Inventors: Emil M. Shtarkman, Southfield, Mich.; John A. Starkovich, Redondo Beach; William W. Davison; Hsiao-Hu Peng, both of Los Angeles; Thomas J. Fitzgerald, Rossmoor, all of Calif.

[73] Assignee: TRW Inc., Lyndhurst, Ohio

[21] Appl. No.: 957,693

[22] Filed: Oct. 7, 1992

[51] Int. Cl.$^5$ .......................... H01F 1/28; F16F 6/00
[52] U.S. Cl. ........................ 252/62.56; 252/62.52; 252/62.54; 252/62.55; 252/74; 252/75; 252/71; 252/502; 252/503; 252/513; 252/519; 188/267; 267/140.14; 267/140.15
[58] Field of Search .................. 252/62.52, 62.51, 78.3, 252/572, 502, 503, 519, 309, 513, 62.56, 62.53, 62.54, 62.55, 74, 75, 512, 71; 188/267; 267/140.14, 140.15

[56] References Cited

U.S. PATENT DOCUMENTS

| | | |
|---|---|---|
| 2,751,352 | 6/1956 | Bondi . |
| 2,772,761 | 12/1956 | Janson . |
| 3,006,656 | 10/1961 | Shaub . |
| 4,280,918 | 7/1981 | Homola et al. . |
| 4,732,706 | 3/1988 | Borduz et al. . |
| 4,942,947 | 7/1990 | Shtarkman ..................... 188/267 |
| 4,957,644 | 9/1990 | Price et al. . |
| 4,992,190 | 2/1991 | Shtarkman et al. .............. 252/62.52 |
| 5,013,471 | 5/1991 | Ogawa . |
| 5,039,559 | 8/1991 | Sang et al. . |
| 5,167,850 | 12/1992 | Shtarkman et al. .............. 252/62.52 |

FOREIGN PATENT DOCUMENTS 0406692  1/1991  European Pat. Off. .

OTHER PUBLICATIONS

A publication entitled "Quest", dated Summer, 1986, on pp. 53-63, contains an article Exploring the TRW Carbons by Jack L. Blumenthal et al. (month unknown).

*Primary Examiner*—Prince Willis, Jr.
*Assistant Examiner*—Alan D. Diamond
*Attorney, Agent, or Firm*—Tarolli, Sundheim & Covell

[57] ABSTRACT

A rheological fluid composition which is responsive to a magnetic field. The composition comprises a vehicle, magnetizable particles suspended in the vehicle and a dispersant. The dispersant comprises particles having no dimension greater than 10 nanometers. The dispersant is preferably carbon.

19 Claims, 7 Drawing Sheets

FLUID RESPONSIVE TO A MAGNETIC FIELD

BACKGROUND OF THE INVENTION

1. Technical Field

The present invention relates to a rheological fluid which is responsive to a magnetic field.

2. Background Art

Rheological fluids responsive to magnetic fields are known. Such fluids, are referred to herein as electrorheological magnetic fluids (ERM) fluids and are used in clutches, shock absorbers, and other devices. A characteristic of these fluids is that, when they are exposed to a magnetic field, small solid ferromagnetic particles in the fluid move into alignment along lines of magnetic flux forming chains of magnetically connected particles. These chains have a significant strength in tension and hence substantially reduce the ability of the fluid to flow.

A clutch, shock absorber, or other such device for regulating the motion or energy transmitted between relatively displaceable members, will have spaced-apart relatively displaceable component parts. The ERM fluid is disposed between the parts. Decreasing the ability of the fluid to flow correspondingly increases the energy required to cause the component parts to move with respect to each other. This characteristic can be used to provide the desired clutch, shock absorber or other function.

ERM fluids may include a liquid carrier or vehicle and magnetizable solid particles suspended in the vehicle. The vehicle can be a dielectric medium, such as hydrocarbon, silacarbon, or silicone oil. Examples of magnetizable solid particles are iron, nickel, cobalt, magnetite, ferrite(s), $Fe_2O_3$, alloys and compounds of iron, nickel, or cobalt with rare-earth elements, chromium, silicon, boron, mixtures of the above, and magnetizable stainless steel.

U.S. Pat. No. 4,992,190, to Shtarkman, assigned to the assignee of the present application, discloses a fluid responsive to a magnetic field. The fluid comprises iron powder, an oil vehicle, and silica-gel as a dispersant for the iron powder in the vehicle. Silica gel has an average particle size, typically, of about 0.05 micrometers (50 nanometers).

U.S. Pat. No. 2,772,761 to Janson discloses a composition for an electromagnetic clutch. The composition comprises iron particles, a vehicle, and graphite particles to prevent interlocking of the iron particles. The sizing of the graphite particles is imprecisely described as "colloidal".

U.S. Pat. No. 2,751,352 to Bondi discloses a magnetic fluid for a clutch or like apparatus which comprises an iron powder, a number of organic lubricants including polymers and silicones, and an oleophobic-ferrophilic liquid dispersant. The oleophobic-ferrophilic dispersant is described as a polar liquid capable of coating the iron particles to prevent them from being wetted by the organic lubricants.

U.S. Pat. No. 3,006,656 to Shaub discloses a magnetic material for shock absorbers which comprises carbonyl iron powder, and an additive such as oil, kerosene, benzene, graphite, chalk, mica, soapstone, a silicone, and glycerine. No particle sizings are specified in the patent.

A large number of patents disclose the use of dispersants for compounding ferrofluids. Ferrofluids are liquid/ferro particle mixtures of great scientific interest that have been used to provide fluid seals for rotating machinery, a coolant medium for a voice coil or loudspeaker, a dampening liquid in an inertia damper, a bearing liquid, or a ferro lubricant. U.S. Pat. No. 4,732,706 to Borduz et. al. discloses that stability is an important requirement in a ferrofluid and that the dispersants which are used are soluble and ionizable in the carrier liquid. Surfactant ions are preferentially absorbed from the solution onto the ferromagnetic particles. The ferromagnetic particles thus receive an electrostatic charge equal to the charge of the absorbed ions. This causes one ferromagnetic particle to be physically repelled away from another, in effect stabilizing the ferrofluid.

U.S. Pat. No. 4,957,644 to Price discloses the use of a ferrofluid in a clutch. The ferrofluid comprises magnetizable particles, a fluid carrier, and a chelating agent. The chelating agent dissolves in the carrier liquid. Molecules of the chelating agent bond to the magnetizable particles, and the magnetizable particles thus repel each other, as in the '706 patent.

U.S. Pat. No. 5,013,471 to Ogawa discloses a magnetic fluid comprising ferromagnetic particles, and an oil carrier. The ferromagnetic particles are dispersed by a chloro-silane type surfactant which forms an absorbed film on the surfaces of the ferromagnetic particles.

U.S. Pat. No. 4,280,918 to Homola discloses a magnetic dispersion containing magnetic particles and colloidal silica particles irreversibly bonded to the magnetic particles. The bonding of the colloidal silica particles to the magnetic particles is achieved electrostatically.

A publication entitled "Quest", dated Summer, 1986, on pages 53-63, contains an article "Exploring the TRW Carbons", by Jack L. Blumenthal et. al. The publication is published by the assignee of the present application. The publication discloses a particulate suspension for a fluidic device comprising iron powder (75% by weight), mineral oil, and 1% TRW carbon. TRW carbon is a filamentary carbon in which the carbon fibers have a diameter of about 0.05 to 0.5 microns and a length up to several thousand times the diameter. The particles are made in a catalytic carbon disproportion reaction in which a low heating value fuel gas or other source of carbon is used as the reaction feed.

U.S. Pat. No. 5,039,559 to Sang et. al. discloses magnetically attractable particles which comprise a core of magnetic material encapsulated in a metal oxide coating. Examples of the metal oxide coatings are aluminum oxide, silicon dioxide, titanium dioxide, zirconium oxide, and hydroxy-apatite (calcium phosphate). The particles are stated to have a diameter less than 100 microns.

Known ERM fluids exhibit a phenomenon known as "stick-slip" behavior. This behavior is characterized by a rapid non-linear increase in shear stress for relatively small deformations or motion up to a point and followed by a precipitous drop in shear stress with continued deformation or relative motion of the magnetizable particles in the ERM fluid. The shear stress level and drop off rate depend on several factors including the strength of the applied magnetic field. This behavior limits the allowable working stress that an ERM fluid will withstand and gives rise to undesirable fluctuations in applied shear stress. This can result in "chatter" if the load applied to the ERM fluid is near or above the point where the shear stress drops and the fluid cycles between its load-carrying phase and its slipping phase.

SUMMARY OF THE INVENTION

The present invention is a rheological fluid which is responsive to a magnetic field. The fluid consists essentially of a vehicle; magnetizable particles suspended in the vehicle; and a dispersant. The dispersant comprises an amount of small, non-magnetizable, dispersant particles which are insoluble in the vehicle. The dispersant particles have no dimension greater than 10 nanometers. The dispersant particles are capable of reversibly bonding to the magnetizable particles by Van der Waals forces. The amount of dispersant particles is an effective amount to provide a thin coating of dispersant particles on the surface of each of the magnetizable particles. The coating prevents the magnetizable particles from directly contacting each other during application of magnetic fields and forming particle agglomerates in the absence of a magnetic field.

For purposes of the present application, the term "reversibly bonding" means that the dispersant particles are neither electrostatically bonded to the surface of the magnetizable particles, nor fused to the surface of the magnetizable particles. The dispersant particles are readily displaced on and away from the surface of the magnetizable particles.

An effective amount of dispersant particles is about 0.1-20 volume percent based on the volume of the magnetizable particles, preferably about 1-7 percent.

Preferably, the vehicle is present in an effective amount to wet the surfaces of the magnetizable particles and the dispersant particles and to fill the voids between the magnetizable particles. Broadly, the amount of vehicle can be about 10-100 volume percent based on the combined volume of dispersant plus magnetizable particles. A preferred amount is about 25-65 volume percent based on the volume of the dry mixture of dispersant plus magnetizable particles.

The present invention also resides in a clutch, shock absorber, and other such device comprising the rheological fluid of the present invention.

Advantages of the rheological fluid of the present invention are that the fluid exhibits good stick-slip behavior. In addition, the fluid achieves a higher shear stress than is achievable with either a ferrofluid, or state-of-the-art rheological fluids suggested for such applications as clutches, shock absorbers and other devices.

In a preferred embodiment of the present invention, the vehicle is hydrocarbon, silacarbon or silicone oil; the magnetizable particles are electrically insulated reduced carbonyl iron; and the dispersant is a plurality of carbon particles each of which has no dimension greater than about 50 nanometers.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
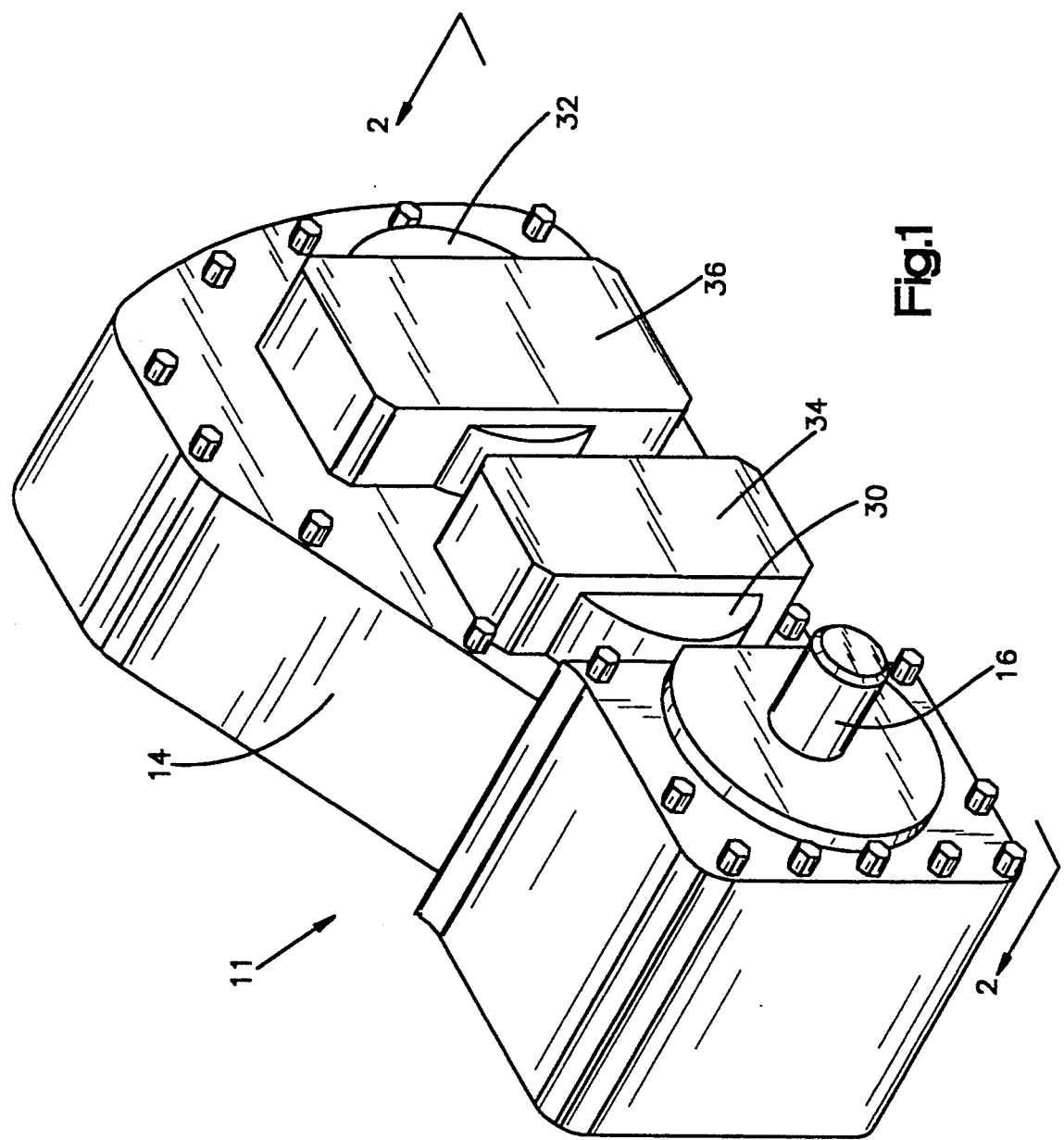
FIG. 1 is a perspective view of a rotary shock absorber test apparatus which uses a rheological fluid in accordance with the present invention.
Figure 2:
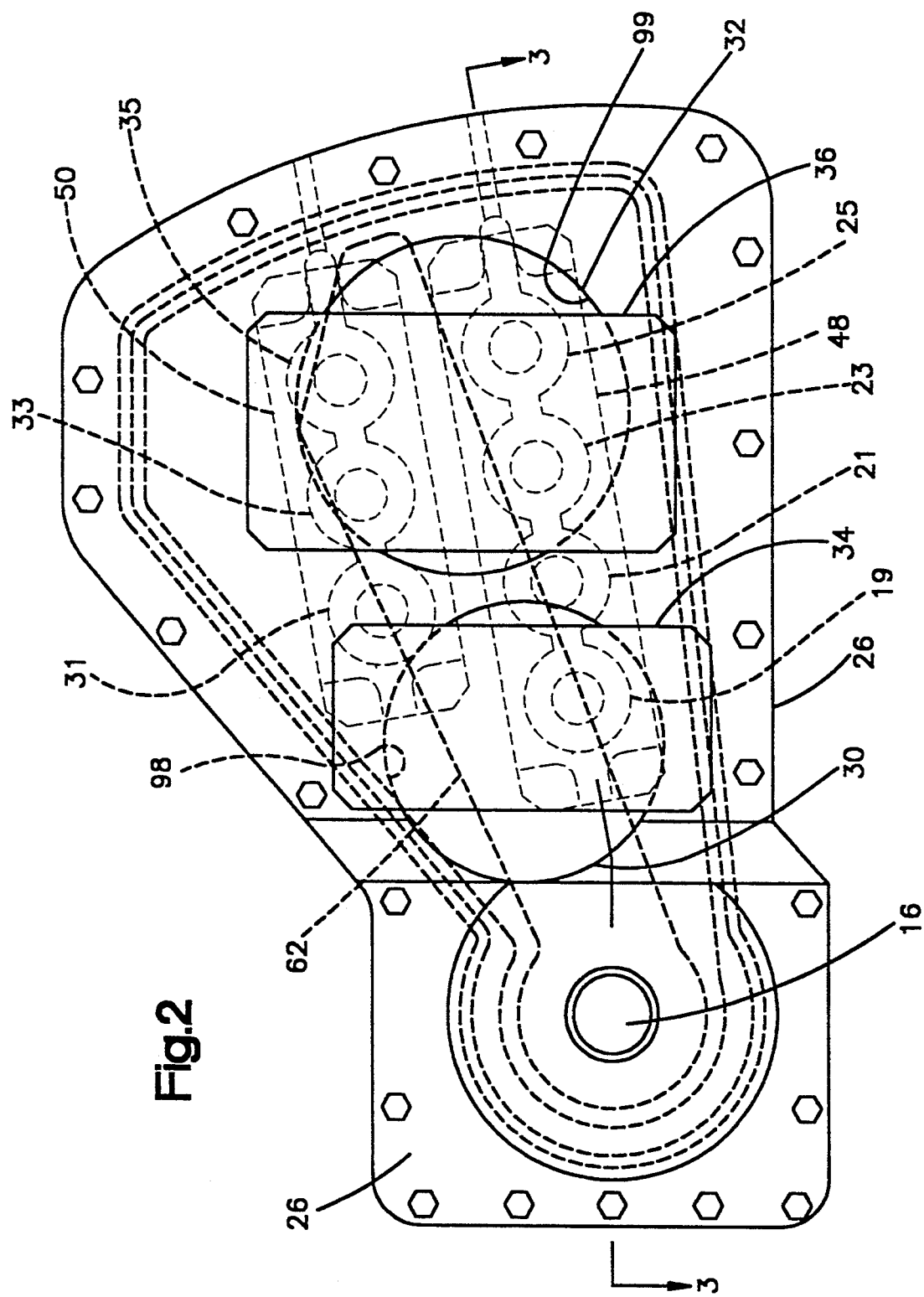
FIG. 2 is a sectional view taken approximately along line 2—2 of FIG. 1.

ERM fluids suitable for such applications as clutches and shock absorbers must possess a combination of properties that is often difficult to achieve simultaneously in one fluid. To be practical for commercial applications, these ERM fluids need to (i) contain high concentrations of magnetizable material, (ii) provide a predictable change in shear stress with changes in applied magnetic field, (iii) possess reasonable viscosity properties that permit their manufacture and deformation or flow in the operational device, and (iv) maintain stable chemical and mechanical properties in storage and usage.

The present invention relates to an ERM fluid which is responsive to a magnetic field and achieves the above properties. The fluid comprises a vehicle, magnetizable particles suspended in the vehicle, and a dispersant. The fluid is particularly designed for use in a vehicle suspension system or in similar applications. Such fluids are also useful in engine mounts, rotary dampers, clutches, and brakes.

The magnetizable particles may be any suitable magnetizable material such as iron, nickel, cobalt, magnetite, ferrite(s), $Fe_2O_3$, alloys and compounds of iron, nickel, or cobalt with rare-earth elements, chromium, silicon, boron, mixtures of the above, and magnetizable stainless steel. A preferred magnetizable particulate is insulated reduced carbonyl iron. Generally, the magnetizable particles will have an average particle size in the range of about 0.1-10 microns.

Carbonyl iron is manufactured by the decomposition of iron pentacarbonyl $Fe(CO)5$. This process produces a spherical unreduced particle which has what is referred to as an onion-skin structure due to minute carbon deposits in alternating layers. The carbon content is about 1%. Reduction or de-carburization of the unreduced powder is carried out by exposing the powder to a hydrogen atmosphere. This destroys the onion-skin structure and produces a composite of randomly arranged minute iron particles. The carbon content of the powder is about 0.075%.

Reduced particles which are also insulated are marketed by GAF Corporation under the designation "CIP-R-2511". The particles have an average particle diameter of 4-6 microns (0.5 maximum % on a 200 mesh screen) and an iron content of 99% minimum.

To prepare insulated, reduced particles, the reduced powders are coated with an insulation coating. The insulation coating can be any particle-coating agent capable of insulating the carbonyl iron particles and preventing interparticle eddy currents or dielectric leakage. The insulation coating on the "CIP-R-2511" powders is a discontinuous layer of silicon oxide, primarily silicon dioxide fused to the surface of the core carbonyl iron particles. The silicon comprises, by way of example, about 6.9 atomic percent of the surface composition of the carbonyl iron particles. Silicon dioxide is dielectric, and provides electrical resistivity.

It is believed that the reduced powders have a more random arrangement of minute iron particles than the so-called "straight" powders, and that this results in a lower hysteresis effect than with the "straight" powders. The insulation on the particles is present in an effective amount to reduce parasitic eddy currents within the powders which eddy currents could adversely affect the magnetic field strength in the fluid. The insulation thus enhances the efficiency of the magnetic fluid.

The ERM fluid of the present invention has a low concentration of submicron-dimension particulate material as a dispersant. The submicron particulate dispersant assists in keeping the dense magnetizable particles suspended and dispersed in a non-agglomerated state able to act independently and more freely respond to changes of magnetic field and fluid shear conditions. The dispersant particles impart or enhance the shear thinning viscosity properties of the ERM fluid. The dispersant particles also produce a gel-like state with a small yield strength which is useful for maintaining a stable magnetizable particle suspension. Because of their small radius and position in the vicinity of the magnetizable particle surface, the dispersant particles assist in keeping the magnetizable particles physically separated, wetted and lubricated with liquid vehicle. Due to this combination of properties, the submicron dispersant particles permit the ERM fluid to be formulated with a higher concentration of magnetizable particles, for a given fluid viscosity, than ERM fluids formulated without such dispersants, or with larger dispersant particles. These properties are important both for increasing the rheological magnetic effect for a given fluid volume or unit of input of magnetic power and for extending the service life and overall operational smoothness of the device in which the ERM fluid is used.

The dispersant of the present invention consists essentially of particles having no dimension greater than 10 nanometers. The dispersant particles which have a diameter in the size range from 2 to 10 nanometers (0.002 to 0.01 microns), minimize stick-slip behavior.

The dispersant particles must be non-magnetic and insoluble in the carrier vehicle.

The dispersant particles may also possess the following characteristics: (1) a specific surface area between 200 and 2,500 square meters per gram, (2) a low dry bulk density ranging from 0.005 to 0.1 gram per cubic centimeter, and (3) a propensity for being wetted by the liquid vehicle while exhibiting no chemical reactivity with the liquid vehicle or magnetic particles. Avoidance of chemical reactions is an important property of the dispersant particles since reactions could alter the properties of the magnetizable particles. Thus, the dispersant particles must be chemically inert.

The dispersant particles in order to be effective and to have a useful service life need to resist deformation and/or disintegration under the stress of continued use. This requires choosing a material with sufficient strength to withstand the specific forces or stresses developed in the actual device or application. Dispersant particles may be made of different materials like single element metals or non-metal substances such as carbon, boron, aluminum, non-magnetizable iron, germanium and silicon. Inorganic compounds like metal carbides, oxides, nitrides, and other salts of aluminum, boron, germanium, hafnium, iron, silicon, tantalum, titanium, tungsten, yttrium and zirconium, and mixtures of these materials. Compounds containing Group I and/or Group II metal elements from the periodic table, including the halides, nitrides, nitrates acetates, oxides, borates, phosphates and carbides thereof, can also be used.

Organic compounds and polymers such as phenolics, epoxies, and polyimides may also be used to make dispersants as well as polymer-ceramic hybrid type materials like a silica-siloxane polymer materials.

The fine dimension dispersant particles may be produced by a variety of chemical reactions and physical processes. These reactions include organic and inorganic polymer producing condensation reactions metastasis reactions involving the production of insoluble phases, gas decomposition reactions involving heterogeneous catalysts, and phase inversion or separation processes that involve altering the thermodynamic state of the solute or solvent in a solution. In addition to chemical preparation methods, nanometer sized dispersant particles may be produced by physical methods such as grinding, milling, energetic particle or ion sputtering techniques, vapor condensation, electrode arcing, and laser ablation.

The dispersant particles may be produced from chemical reactions involving either gases or condensed phase reactants. Their size is key to their performance.

When dispersant particles are mixed in a liquid vehicle, in a dispersing amount, they coat the magnetizable particles. A dispersing amount is that volume percent, based on the volume of the magnetizable particles, effective to provide a thin coating of dispersant particles, on each magnetizable particle. The coating preferably has a thickness no greater than a few layers of dispersant particles. The small size of the dispersant particles allows the magnetizable particles to be packed more densely in the ERM fluid than they would be if larger dispersant particles were employed. The layer of dispersant particles need not be continuous on a magnetizable particle. Generally, a dispersant amount is in the range of about 0.1-20 volume percent based on the volume of the magnetizable particles, more preferably about 1-7 percent.

The rheological fluids of the present invention are obtained preferably by mixing the carbonyl iron and dispersant particles together, and then adding the desired volume percent of vehicle. The mixture is then homogenized in a homogenizer for a prolonged period of time, for instance, about 12-24 hours under vacuum.

The dispersant particles are attracted to the magnetizable particles by Van der Walls forces and thus bind reversibly to the magnetizable particles. By the use of a predetermined amount of dispersant particles, and the above homogenization, the desired thickness of the coating of dispersant particles on each magnetizable particle is obtained.

The dispersant particles perform one or more of the following functions:

(a) When mixed with the liquid vehicle, in a dispersing amount, they thicken or gel the liquid vehicle. This prevents the magnetizable particles from settling, and maintains a uniform concentration or distribution of magnetic material throughout the vehicle in order to achieve a predictable and reproducible torque-current control response.

(b) They form a thixotropic mixture with the vehicle which has good flow properties when exposed to shear. In effect, the dispersant particles reduce the friction between the magnetizable particles, by maintaining separation between the magnetizable particles, and by wetting the magnetizable particles with the vehicle. This reduces the viscosity (viscous drag) of the ERM fluid in a non-energized device and lowers shear heat generation.

(c) They permit a high magnetizable particle loading in the ERM fluid (with acceptable viscosity and shear heating) so that electric power and device weight may be minimized. This is because only a small amount of the dispersant particles are needed (0.1–20 volume percent) to disperse the magnetizable particles, and the spacing between the magnetizable particles is limited to the amount of dispersant particles between the magnetizable particles.

(d) They minimize fluid "chatter" (noise in a torque-current response curve) or stick-slip during energized operation of the device. Normally, between two adjacent magnetizable particles in an energized ERM fluid, a high static coefficient of friction exists. This means that a relatively large amount of force is required to break the particles loose from each other (from a static state to a dynamic state). When in a dynamic state, the magnetizable particles slip readily with respect to each other. However, a new particle alignment is quickly reached in the energized fluid, and the particles again stick together. This results in fluid chatter. In the present ERM fluid, on the other hand, the static coefficient of friction between adjacent magnetizable particles, coated with the dispersant of the present invention, is lower than the coefficient of sliding friction. This provides a minimum of stick-slip occurrence.

(e) They achieve higher shear stresses than colloidal ferrofluids, in which the separation between the magnetizable particles is of the same order of magnitude as the diameter of the colloidal magnetizable particles themselves, or than an MR fluid. In the present ERM fluid, the resistance to movement of the magnetizable particles in response to an applied magnetic field is much greater than in a ferrofluid because the distance between the magnetizable particles is small compared with the diameters of the magnetizable particles. The resistance to movement of the magnetizable particles in response to an applied magnetic filed is much greater than in an MR fluid because of the high solids concentration of the magnetizable particles and gel strength of the ERM fluid. Thus, a larger amount of force is required (when a magnetic field is applied) to keep one magnetizable particle moving with respect to another, than with either a ferrofluid or an MR fluid.

(f) They reduce both particle-particle and particle-surface wear in the clutch or shock absorber device during extended use.

The preferred dispersant material is carbon. Carbon particles having no dimension greater than 10 nanometers were made by the physical breakdown, e.g. grinding, of fibrous carbon into nano-scale particles. One such fibrous carbon is "TRW Carbon", developed by TRW Corporation. The "TRW Carbon" is disclosed in the publication "Quest", Summer, 1986, pages 53–63, by Jack L. Blumenthal et al., published by TRW Corporation. The disclosure of this publication is incorporated herein by reference.

The "TRW Carbon" is made in a catalytic carbon disproportion reaction in which a low heating value fuel gas or other source of carbon is used as the reaction feed. Individual fibers in the TRW fibrous carbon are from 0.05 to 0.5 microns in diameter and up to a thousand times as long as they are thick.

The vehicle of the composition of the present invention can be any vehicle conventionally employed in an ERM fluid responsive to a magnetic field. Preferably, the vehicle employed is an oil having a viscosity at about 100° F. between one and 1,000 centipoises. Specific examples of suitable vehicles and their viscosities are set forth in the following Table 1:

TABLE 1

| Vehicle | Viscosity |
| --- | --- |
| Conoco LVT oil | 1.5 centipoises at 100° F. |
| Kerosene | 1.9 centipoises at 81° F. |
| Light paraffin oil | 20 centipoises at 100° F. |
| Mineral oil (Kodak) | 40 centipoises at 100° F. |
| Silicone oil | 700 centipoises at 100° F. |

The proportions of ingredients employed in the composition of the present invention can vary over wide ranges. The dispersant is employed in an amount effective to disperse the carbonyl iron particles, to maintain such particles in suspension in the vehicle and to achieve the other functions listed above. The amount of vehicle used is that amount necessary for the vehicle to function as the continuous phase of the composition. Air pockets in the composition should be avoided. The remainder of the composition is essentially the carbonyl iron powder. Preferably, the dispersant is present in the amount of 0.1–20 volume percent, preferably about 1–7 volume percent, based on the volume of the magnetizable particles. The volume of vehicle used is about 10% to about 100%, preferably about 25–65%, based on the combined volume of the carbonyl iron and dispersant.

Particular ratios selected depend upon the application for the ERM fluid. Preferably, the proportions are such that the composition of the ERM fluid has thixotropic properties and is mechanically stable in the sense that the compositions remain homogeneous for prolonged periods of time.

EXAMPLE

A test apparatus was used similar to the rotary shock absorber disclosed in U.S. Pat. No. 4,942,947 assigned to the assignee of the present application. The disclosure of the '947 patent is incorporated herein by reference thereto.

Figure 3:
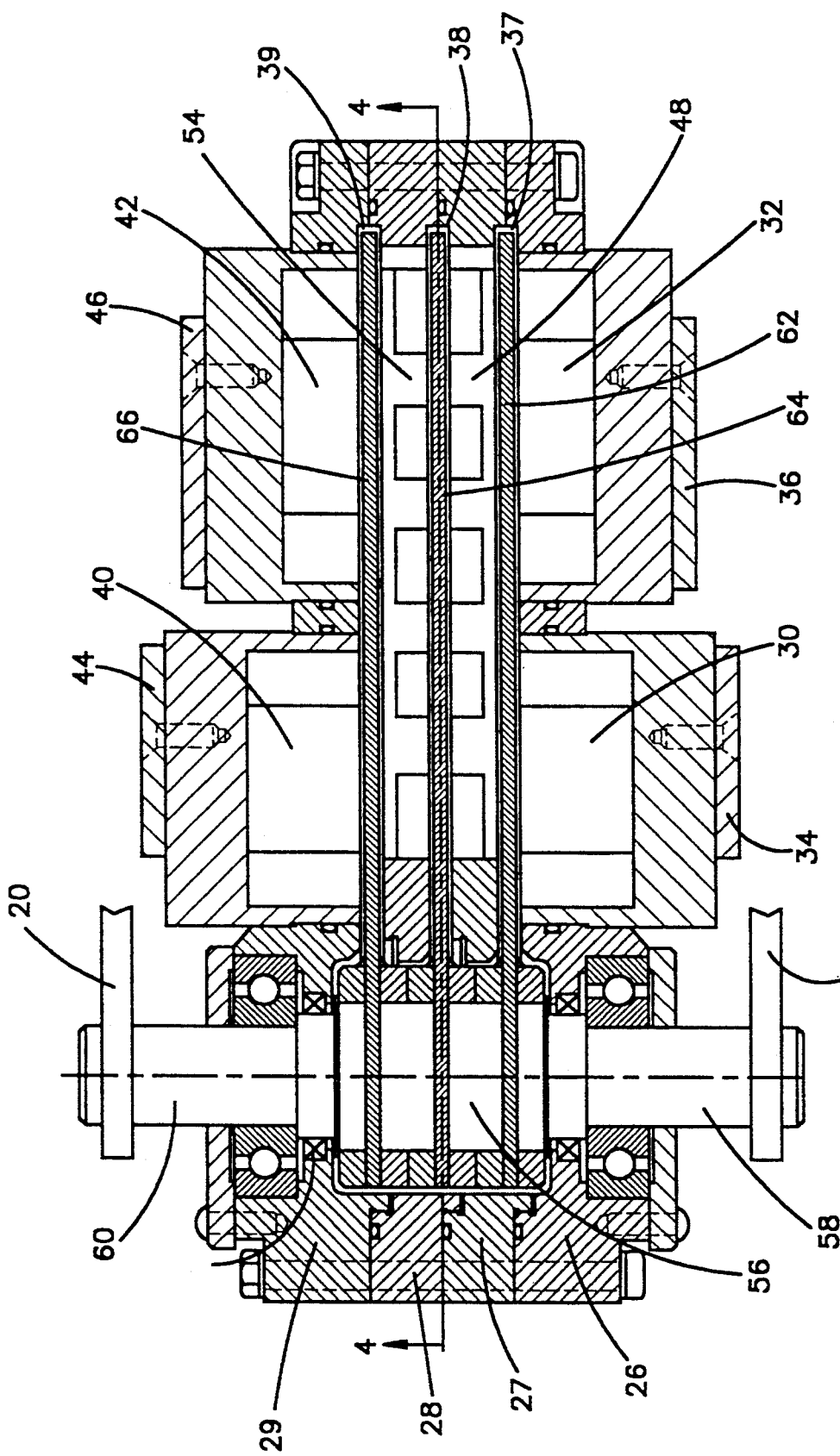
FIG. 3 is a sectional view taken approximately along line 3—3 of FIG. 2.
Figure 4:
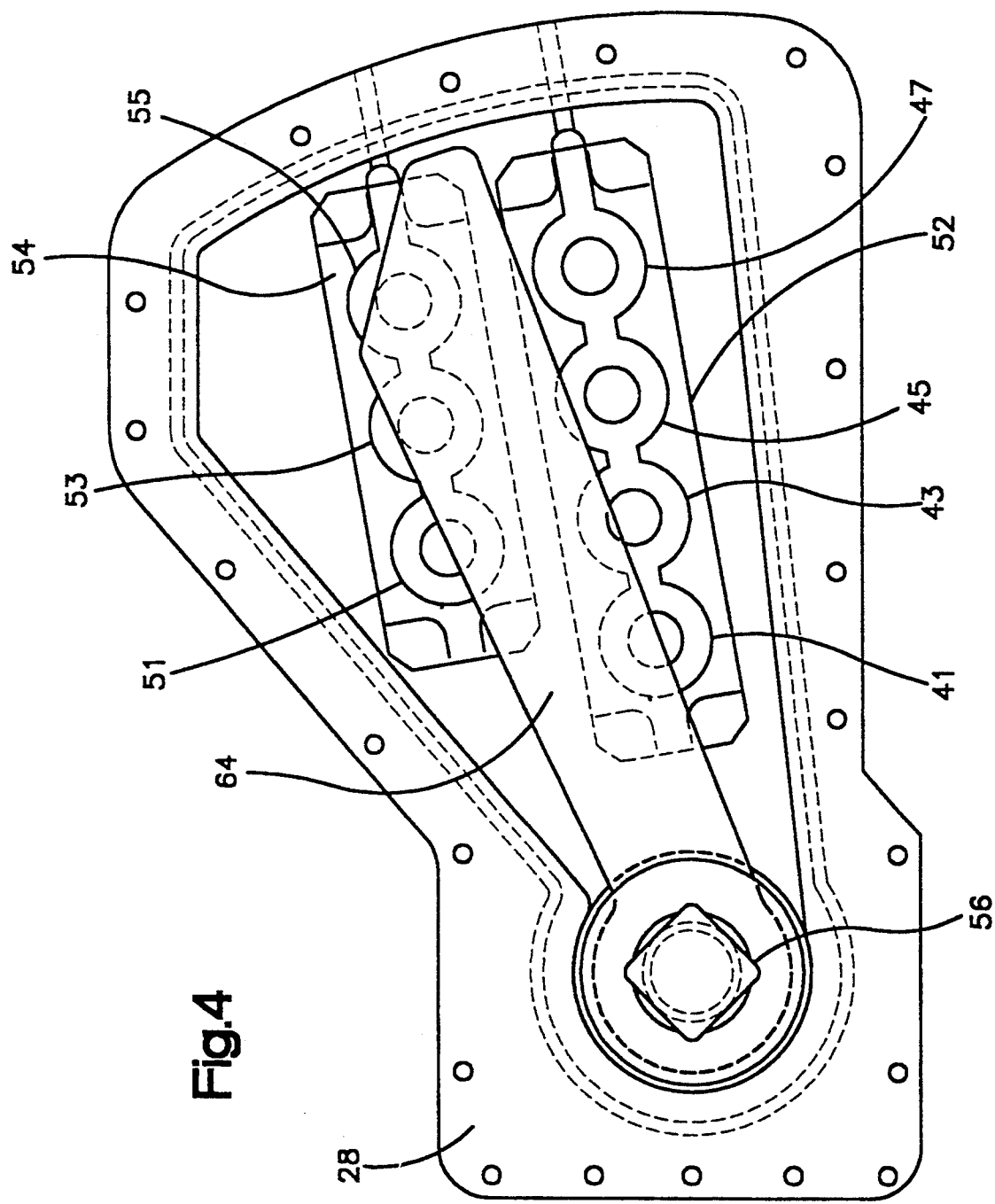
FIG. 4 is a sectional view taken approximately along line 4—4 of FIG. 3.

Referring to FIGS. 1–4, the specific construction of the shock absorber 11 will become apparent. The housing 14 (FIG. 1) includes four housing sectors 26, 27, 28, 29 (FIG. 3). The housing sectors 26, 27, 28, 29 are located in a side-by-side relationship. The housing sectors 26, 27, 28, 29 define three fluid chamber 37, 38, 39 (FIG. 3) within the housing 14. Each of the three fluid chambers 37, 38, 39 has a magnetizable fluid disposed therein.

A shaft 16 (FIGS. 1, 3 and 4) has a square-shaped central portion 56 (FIG. 3) with rounded corners and has two axially opposite end portions 58, 60. Each of the end portions 58, 60 of the shaft 16 has a circular cross-section. Three movable members 62, 64, 66 (FIG. 3) are connected with the square-shaped central portion 56 of the shaft 16 and extend radially of the shaft 16. Each of the movable members 62, 64, 66 has the shape of a rotor blade. The number of rotor blades corresponds to the number of fluid chambers 37, 38 and 39. Each of the three rotor blades 62, 64, 66 extends into an associated one of the fluid chambers 37, 38, 39 and is angularly movable with the shaft 16 relative to the housing 14. The resistance to shear of the fluid in each of the fluid chambers 37, 38, 39 damps movement of each of the rotor blades 62, 64, 66 relative to the housing 14.

Figure 5:
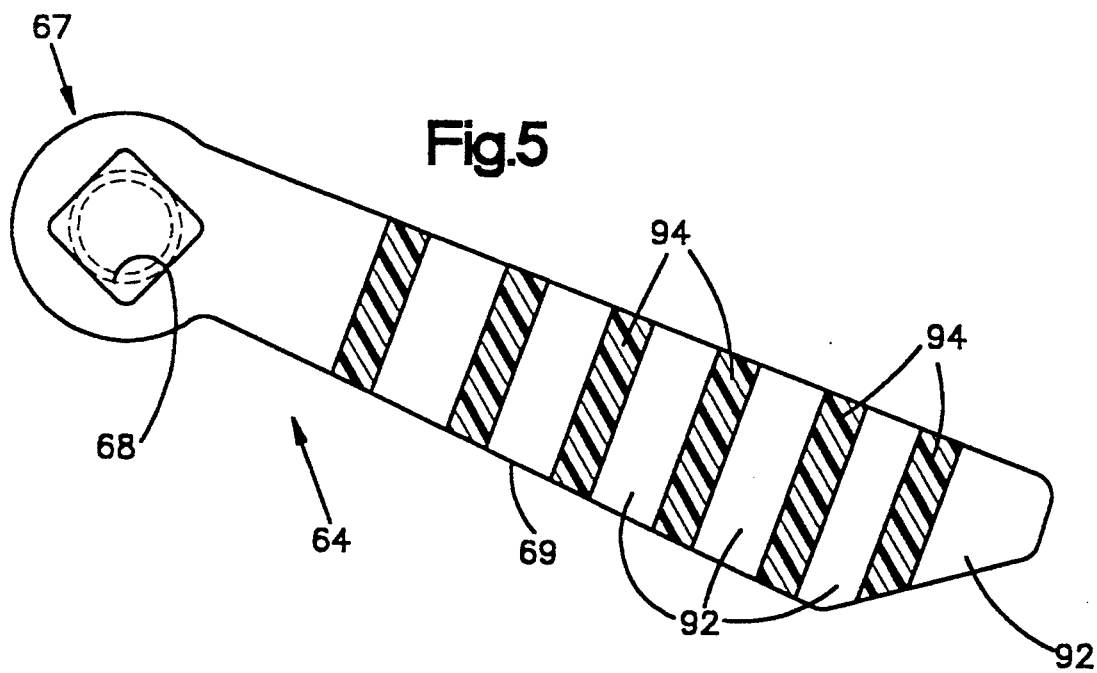
FIG. 5 is a detailed view of a blade used in the rotary shock absorber of FIGS. 1-4.

Each of the rotor blades 62, 64, 66 is identical in construction. For simplicity, only the rotor blade 64 (FIGS. 4 and 5) is described in detail. One end 67 (FIG. 5) of the rotor blade 64 has a square-shaped opening 68 which is complementary to the square shape of the central portion 56 of the shaft 16. The rotor blade 64 has a blade portion 69 which extends into the fluid chamber 38. When the shaft 16 rotates about its longitudinal central axis, the one end 67 of the rotor blade 64 rotates with the shaft 16 and the blade portion 69 of the rotor blade 64 angularly moves about the longitudinal central axis of the shaft 16 and through the fluid in the fluid chamber 38.

The blade portion 69 includes a plurality of paramagnetic steel segments 92 disposed along the radial extent of the blade portion 69. The steel segments 92 are equidistantly spaced apart from one another. Interposed between the plurality of steel segments 92 is a plurality of nonmagnetic insulating segments 94 made of a nonmagnetic material, such as brass, aluminum, or epoxy. The size of each of the insulating segments 94 is relatively small, but is exaggerated in FIG. 5 for illustrative purposes. Each of the insulating segments 94 is connected with its adjacent steel segments by chemical bonding or by using a suitable adhesive.

Each of the housing sectors 26, 27, 28, 29 (FIG. 3) is constructed of a nonmagnetic material, preferably aluminum. The housing sector 26 (FIG. 2) includes two round-shaped holes 98, 99 in which two round-shaped electromagnetic coils 30, 32, respectively, are disposed. The coils 30, 32 (FIGS. 1 and 2) are mechanically fastened to the housing sector 26 by associated brackets 34, 36 (FIG. 1) and suitable fasteners. Two other round-shaped electromagnetic coils 40, 42 (FIG. 3) are mechanically fastened by associated brackets 44, 46 and suitable fasteners to the housing sector 29. The nonmagnetic material of the housing 14 minimizes leakage of magnetic flux from the coils 30, 32, 40, 42.

Furthermore, two modular electromagnets 48, 50 (FIG. 2) are mechanically fastened with suitable fasteners to the housing sector 27. The modular electromagnet 48 has four individual coils 19, 21, 23, 25. The coils 19, 21, 23, 25 are aligned in a linear array and are encapsulated to form a modular unit. The construction of the modular electromagnet 50 is the same as the construction of the modular electromagnet 48, except that the modular electromagnet 50 has only three individual coils 31, 33, 35.

Two other modular electromagnets 52, 54 (FIG. 4) are similar to the modular electromagnets 48, 50, respectively. The modular electromagnets 52, 54 are mechanically fastened by suitable fasteners to the housing sector 28. The modular electromagnet 52 has four individual coils 41, 43, 45, 47. The modular electromagnet 54 has three individual coils 51, 53, 55. The structure and methods used to construct modular electromagnets are well known and, therefore, will not be described.

Figure 6:
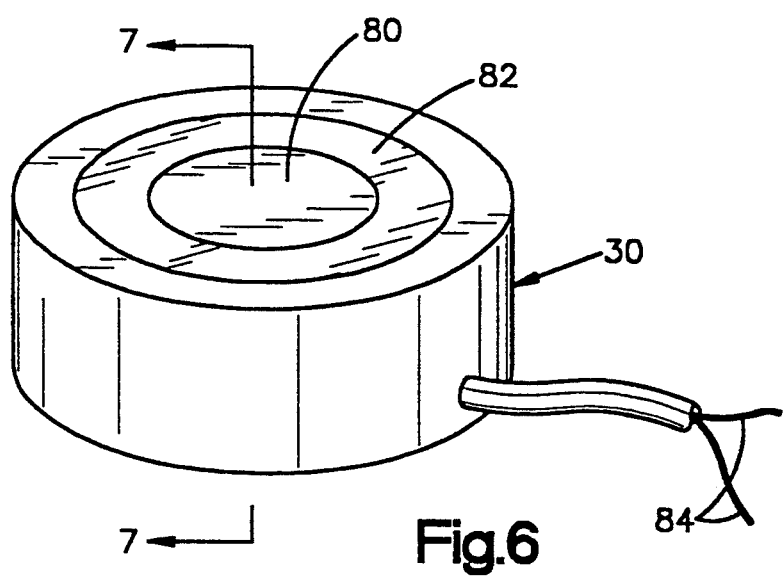
FIG. 6 illustrates an electromagnetic coil used in the rotary shock absorber of FIGS. 1-4.
Figure 7:
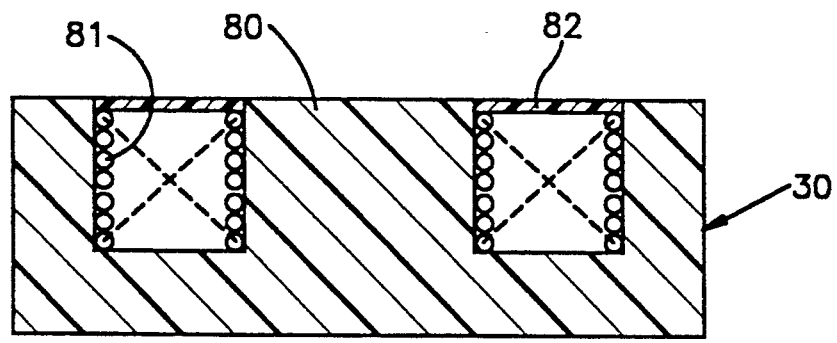
FIG. 7 is a sectional view taken approximately along line 7—7 of FIG. 6.

Referring to FIGS. 6 and 7, the specific construction of the round-shaped electromagnetic coil 30 is shown. The construction of each of the other three round-shaped electromagnetic coils 32, 40, 42 is the same as the construction of the coil 30. For simplicity, only the coil 30 is described in detail. The coil 30 includes a soft iron core 80 around which electrical wire 81 is wound. The electrical wire 81 is covered with a suitable encapsulating material 82 such as epoxy, as is known. The core 80 has screw holes (not shown) for fastening the coil 30 to its respective housing sector 26. A pair of wire-ends 84 extends from the coil 30 for receiving an electrical pulse.

The four round-shaped coils 30, 32, 40, 42 and the four modular electromagnets 48, 50, 52, 54 are mounted at predetermined locations on their respective housing sectors. The two coils 30, 40 (FIG. 3) are mounted and aligned with respect to each other so that the poles of the coil 30 face opposite poles of the coil 40. Similarly, the two coils 32, 42 (FIG. 3) are mounted and aligned with respect to each other so that the poles of the coil 32 face opposite poles of the coil 42. The two modular electromagnets 48, 52 (FIGS. 3 and 4) are mounted and aligned with respect to each other so that the poles of the coils 19, 21, 23, 25 associated with the modular electromagnet 48 face opposite poles of the coils 41, 43, 45, 47 associated with the modular electromagnet 52, respectively. Similarly, the two modular electromagnets 50, 54 (FIGS. 2 and 4) are mounted and aligned with respect to each other so that the poles of the coils 31, 33, 35 associated with the modular electromagnet 50 face opposite poles of the coils 51, 53, 55 associated with the modular electromagnet 54, respectively.

Figure 8:
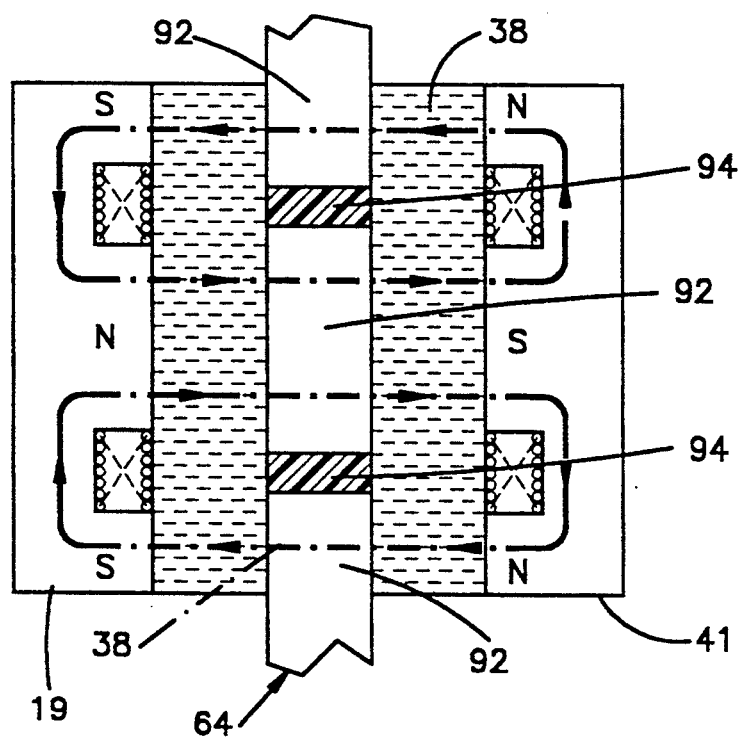
FIG. 8 is a detailed view of a portion of the rotary shock absorber of FIGS. 1-4 showing lines of magnetic flux passing through a blade in the rotary shock absorber.

The spatial relationships and the magnetic interaction between pairs of opposite-facing coils are similar. For simplicity, only the spatial relationship and the magnetic interaction between the coil 19 (FIG. 2) of the modular electromagnet 48 and the coil 41 (FIG. 4) of the modular electromagnet 52 are described. The spatial relationship and the magnetic interaction between the coils 19, 41 is illustrated in FIG. 8 which shows a portion of the rotor blade 64 extending into a portion of the fluid chamber 38. The coils 19, 41 are shown with the poles of the coil 19 facing opposite poles of the coil 41. Thus, the opposite-facing poles of the coils 19, 41 are separated by the rotor blade 64 and the fluid-filled gaps defined therebetween.

When the coils 19, 41 are energized, each coil generates its own magnetic field which interacts with the magnetic field of the other coil. The interaction between the magnetic fields is such that lines of magnetic flux are established between the two coils 19, 41 in the manner as shown in FIG. 8. The lines of magnetic flux established between the two coils 19, 41 pass through the fluid in the fluid chamber 38 and through some of the steel segments 92 of the rotor blade 64. These lines of magnetic flux act on the fluid in the fluid chamber 38 to vary the resistance to shear of the fluid.

The segmenting of the rotor blade 64 with the steel segments 92 and the insulating segments 94 provides an optimum path for the lines of magnetic flux to flow between the two coils 19, 41. If the insulating segments 94 were not interposed between the steel segments 92, then some of the lines of magnetic flux from the coil 19 would cancel with some of the lines of magnetic flux from the coil 41. This cancelling of lines of magnetic flux would occur in the vicinity of the insulating segments 94. However, by providing the insulating segments 94 between the steel segments 92, such cancelling of lines of magnetic flux is eliminated. Thus, by interposing the insulating segments 94 between the steel segments 92, the operation of the shock absorber 11 is made more efficient.

The spatial relationships of the magnetic interaction of other pairs of opposite-facing coils associated with the four modular electromagnets 48, 50, 52, 54 are similar to the spatial relationship and the magnetic interaction of the two coils 19, 41. The coils 21, 23, 25 of the modular electromagnet 48 interact with the coils 43, 45, 47 of the modular electromagnet 52, respectively. The coils 31, 33, 35 of the modular electromagnet 50 interact with the coils 51, 53, 55 of the modular electromagnet 54, respectively. The coil 30 interacts with the coil 40 and the coil 32 interacts with the coil 42. The lines of magnetic flux established between the two coils 30, 40 not only act on the fluid in the fluid chamber 38, but also act on the fluid in the other two fluid chambers 37, 39. Similarly, the lines of magnetic flux established between the two coils 32, 42 not only act on the fluid in the fluid chamber 38, but also act on the fluid in the other two fluid chambers 37, 39.

During operation of the shock absorber 11, the shaft 16 rotates about its longitudinal central axis relative to the housing 14. When the shaft 16 rotates about its longitudinal central axis relative to the housing 14, the three rotor blades 62, 64, 66 angularly move within their respective fluid chambers 37, 38, 39 relative to the housing 14. The movement of the rotor blades 62, 64, 66 is dampened by the shear resistance of the fluid in the fluid chambers 37, 38, 39.

The resistance to shear of the fluid varies as a function of the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54. The resistance to angular movement of the rotor blades 62, 64, 66 within their respective fluid chambers 37, 38, 39 varies as a function of the shear resistance of the fluid. Thus, by varying the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54, the dampening rate of the shock absorber 11 is varied. As already mentioned hereinabove, the dampening rate of the shock absorber 11 varies as a function of the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54.

To test the coupling strength of the fluid of the present invention when exposed to a magnetic field, the shaft 16 was connected by means of a coupling to a torque motor (not shown). The torque motor was associated with a force meter for measuring shear stress.

Figure 9:
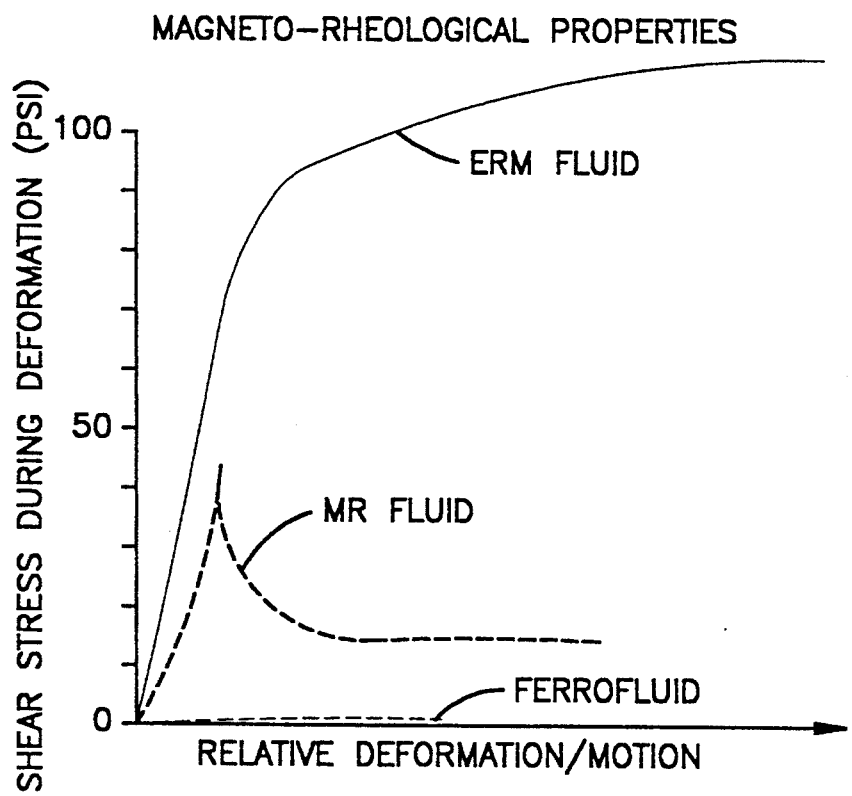
FIG. 9 is a graph plotting shear stress against relative deformation and comparing this property of the fluid of the present invention with prior art fluids.

The shear stress was measured in terms of pounds force per square inch. The force is the number of pounds, exerted by the torque motor, required to move the blades 62, 64, 66 in fluid chambers 37, 38 and 39, while under the influence of the magnetic fields. The unit area is the cross-sectional area of the blade 62, 64 and 66. Referring to FIG. 9, the shear stress during deformation is plotted against relative deformation. The relative deformation is the velocity of the blades 62, 64 and 66 in the chambers 37, 38 and 39, in inches per second, divided by the gap, in inches. The gap is the distance between each of the blades 62, 64 and 66 and the housings 26, 27, 28 and 29 defining chambers 37, 38 and 39. The relative deformation is intended to be a measure of the velocity of one magnetizable particle with respect to another, and is expressed in terms of seconds−1. It is a relative value, and the curves of FIG. 9 are reproducible with apparatus other than as shown in FIGS. 1–8, and with dimensions other than as disclosed therein. In addition, the general shapes of the curves of FIG. 9 are not dependent upon the intensity of the magnetic field used. All of the curve values of FIG. 9 are with the device of FIGS. 1–8 being energized, or under the influence of a magnetic field.

In FIG. 9, three curves are shown. One curve is labelled "ERM Fluid". The second curve is labelled "MR Fluid". The third curve is labelled "Ferrofluid".

The composition of the ERM fluid was 5% by volume dispersant particles based on the volume of magnetizable particles. The magnetizable particulate was insulated, reduced, carbonyl iron (CPR-R-2511). The dispersant was carbon particles having no dimension greater than 10 nanometers, prepared from TRW carbon. The amount of vehicle was about 45% by volume, based on the combined volume of carbonyl iron and dispersant. The vehicle was mineral oil. The ERM fluid was placed in each of the fluid chambers 37, 38, and 39 of the shock absorber 11.

Under the influence of the magnetic fields of the coils 30, 32, 40, and 42 and 19, 21, 23, 25, 31, 35, 41, 43, 45, 47, 51, 53, and 55, the shear stress exerted by the ERM fluid increased, along a steep slope, with increased relative deformation, until a shear stress of about 100 psi was reached. The shear stress then leveled off, increasing at a much slower rate with increased relative deformation. It is significant that the change in the shear stress, with increased relative deformation, was in an up direction only. The shear stress dropped to zero only when the magnetic fields, imposed by the coils of the apparatus on the ERM fluid, was relaxed.

What this curve of FIG. 9 indicates is that the proximity of the magnetizable particles, in the ERM fluid of the present invention, maintains, at all times, a sufficient number of chains of magnetizable particles, within the flux lines of the magnetic fields, to resist deformation, regardless of the speed of the blades 62, 64 and 66 within the chambers 37, 38 and 39. The particles never move far enough apart from each other, in enough quantity to result in an excessive amount of the "slip" phenomena referred to above. Further, the only effect of increased relative movement of the blades 62, 64 and 66 is increased force resisting that movement. The increased force resisting movement of the blades 62, 64 and 66 is simply due to the relative movement of a larger number of magnetizable particles, in the chambers 37, 38 and 39, in the unit of time (seconds−1) involved.

It should be noted that the shape of the curve of FIG. 9 is what is significant, and not actual shear stress numbers. These obviously will vary with such parameters as the dimensions and design of the apparatus 11, the composition of the ERM fluid, and the intensity of the applied magnetic fields. However, the shape of the curve, in essence, will not vary with changes in such parameters.

FIG. 9 shows the curve that is experienced with a state-of-the-art MR fluid. A state-of-the-art MR fluid is disclosed in the publication "The Magnetic Fluid Clutch", by Jacob Rabinow, pages 1308-1315, AIEE Transactions, 1948, Volume 67. The disclosure of this publication is incorporated herein by reference. The fluid comprises a mixture of five parts by weight carbonyl E iron and one part by weight light machine oil. The curve for the state-of-the-art MR fluid is based in part on actual data obtained with the Rabinow fluid, and in part on extrapolation from the data which was obtained.

As shown in FIG. 9, the shear force of the MR fluid initially increases with relative deformation, as with the ERM fluid. This is in part due to the static coefficient of friction between the particles as well as sliding coefficient of friction. However, at less than about 50 psi shear stress, the separation of particles becomes enough that the static coefficient of friction no longer plays a part. The shear force is dependent only on the sliding coefficient of friction, which is relatively low, and slip occurs with a loss of shear force.

FIG. 9 also gives a typical curve for a ferrofluid. The curve in FIG. 9 for the ferrofluid is not based on actual test data, but rather is based on observations and experience with this fluid. A ferrofluid composition, as disclosed in the above-mentioned Borduz et. al. U.S. Pat. No. 4,732,706, typically contains magnetizable particles and a surfactant dispersant, which functions to separate one magnetizable particle from another by electrostatic repulsion. With the magnetizable particles further separated apart, than either in an "MR" fluid or a ERM fluid, the ferrofluid achieves only a very low shear force, typically about 0.5 psi.

Figure 10:
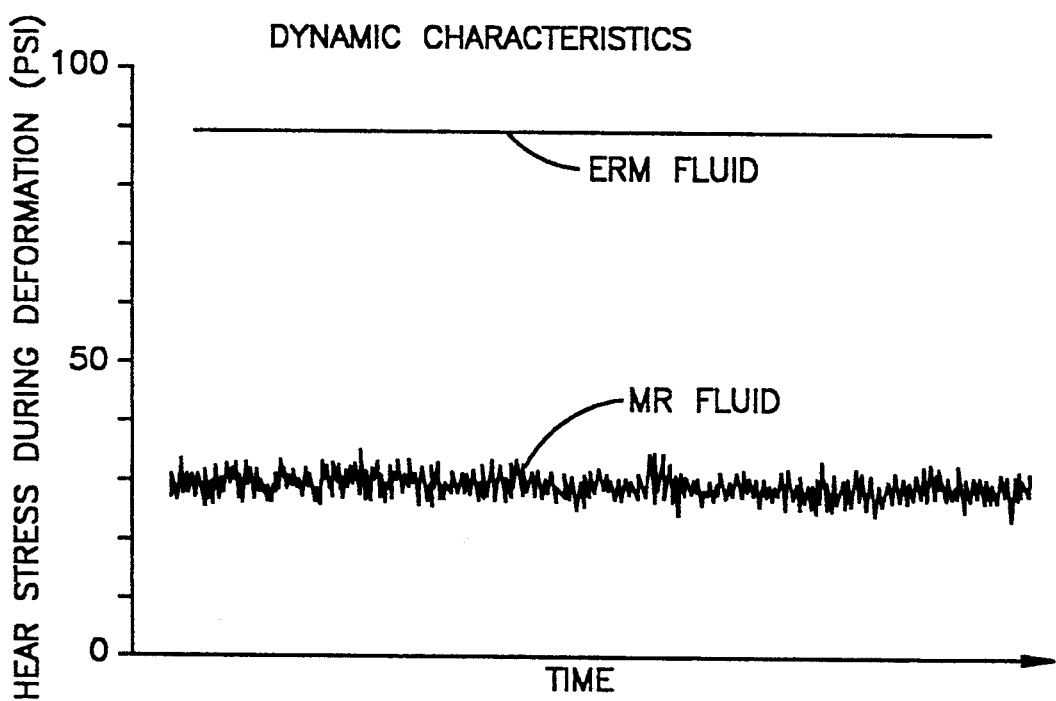
FIG. 10 is another graph plotting shear stress against time and comparing this property of the fluid of the present invention with this property of a state-of-the-art rheological fluid.

FIG. 10 further illustrates the advantages of the ERM fluid of the present invention. FIG. 10 plots shear stress against time. As shown in FIG. 10, the shear stress for the ERM fluid of the present invention remains at a relatively constant high level for a prolonged period of time while under load. In contrast, the MR fluid gives a rapidly fluctuating shear stress, due to slip-stick, at a much lower shear stress load.

From the above description of a preferred embodiment of the invention, those skilled in the art will perceive improvements, changes and modifications in the invention. Such improvements, changes and modifications within the skill of the art are intended to be covered by the appended claims.

Having described the invention, the following is claimed:

1. A rheological fluid composition which is responsive to a magnetic field, said fluid comprising:
   a vehicle;
   magnetizable particles suspended in said vehicle; and
   a dispersant comprising small, non-magnetizable, dispersant particles which are insoluble in the vehicle, having no dimension greater than 10 nanometers, in an effective amount to provide a thin coating of dispersant particles on the surface of each of the magnetizable particles;
   said dispersant particles being reversibly bonded to the surface of the magnetizable particles.

2. The composition of claim 1 wherein the vehicle is present in an effective amount to wet the surfaces of the magnetizable particles and the dispersant particles and to fill the voids between the magnetizable particles.

3. The composition of claim 1 wherein the amount of said dispersant particles is about 0.1-20 volume percent based on the volume of the magnetizable particles.

4. The composition of claim 3 wherein said vehicle is present in the amount of 10-100 volume percent based on the combined volume of the magnetizable particles and dispersant.

5. The composition as set forth in claim 1 wherein said dispersant particles have a diameter of from about two nanometers to 10 nanometers.

6. The composition as set forth in claim 1 wherein said dispersant is selected from the group consisting of carbon, aluminum, boron, non-magnetizable iron, silicon, and germanium; carbides, oxides, and nitrides of aluminum, boron, germanium, hafnium, iron, silicon, tantalum, titanium, tungsten, yttrium, zirconium; Group 1 metal and Group 2 metals compounds; silicon and siloxane organic polymers; non-silicon containing phenolics, epoxies, and polyimides, and silica-siloxane polymers, and mixtures thereof.

7. A composition as set forth in claim 1 wherein said dispersant is carbon.

8. A composition as set forth in claim 1 wherein said magnetizable particles are electrically insulated reduced carbonyl iron.

9. A composition as set forth in claim 1 wherein said dispersant is carbon particles with a diameter of from about 2 nanometers to 10 nanometers and a surface area of about 250 to about 2,500 square meters per gram.

10. The composition of claim 1 in which said fluid is homogenized.

11. The composition of claim 1 comprising 1-7 volume percent dispersant particles based on the volume of magnetizable particles.

12. A rheological fluid composition which is responsive to a magnetic field, said fluid consisting essentially of:
    a vehicle;
    magnetizable particles suspended in said vehicle; and
    a dispersant consisting essentially of a plurality of particles each of which has no dimension greater than 10 nanometers.

13. A rheological fluid composition which is responsive to a magnetic field, said fluid consisting essentially of:
    a vehicle;
    magnetizable particles suspended in said vehicle, said magnetizable particles comprising electrically insulated reduced carbonyl iron; and
    a dispersant consisting essentially of a plurality of particles each of which has no dimension greater than about 10 nanometers.

14. A composition as set forth in claim 13 wherein said dispersant is selected from the group consisting of carbon, aluminum, boron, non-magnetizable iron, silicon, and germanium; carbides, oxides, and nitrides of aluminum, boron, germanium, hafnium, iron, silicon, tantalum, titanium, tungsten, yttrium, zirconium; Group 1 metal and Group 2 metal compounds; silicon and siloxane organic polymers; non-silicon containing phenolics, epoxies, and polyimides, and silica-siloxane polymers; and mixtures thereof.

15. A composition as set forth in claim 13 wherein said dispersant is carbon.

16. A composition as set forth in claim 15 wherein said dispersant is carbon particles having a diameter of from about 2 nanometers to about 10 nanometers.

17. A composition as set forth in claim 16 wherein said dispersant particles have a surface area of from about 250 to about 2,500 square meters per gram.

18. A shock absorber which contains the rheological fluid composition of claim 1.

19. A clutch which contains the rheological fluid composition of claim 1.

* * * * *

UNITED STATES PATENT AND TRADEMARK OFFICE
CERTIFICATE OF CORRECTION

PATENT NO. : 5,354,488

DATED : October 11, 1994

INVENTOR(S) : Emil M. Shtarkman, John A. Starkovich, William W. Davison, Hsiao-Hu Peng, and Thomas J. Fitzgerald It is certified that error appears in the above-indentified patent and that said Letters Patent is hereby corrected as shown below:

Cover Page, U.S. Patent Documents section, after "Shtarkman" delete --et al.--.

Signed and Sealed this

Twenty-first Day of February, 1995

Attest:

BRUCE LEHMAN

*Attesting Officer*  *Commissioner of Patents and Trademarks*